(12) United States Patent
Shoemaker et al.

(10) Patent No.: US 9,854,081 B2
(45) Date of Patent: Dec. 26, 2017

(54) VOLUME CONTROL FOR MOBILE DEVICE USING A WIRELESS DEVICE

(71) Applicant: APPLE INC., Cupertino, CA (US)

(72) Inventors: David J. Shoemaker, Redwood City, CA (US); Eugene Dvortsov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/774,666

(22) PCT Filed: Mar. 14, 2014

(86) PCT No.: PCT/US2014/028163
§ 371 (c)(1),
(2) Date: Sep. 10, 2015

(87) PCT Pub. No.: WO2014/143959
PCT Pub. Date: Sep. 18, 2014

(65) Prior Publication Data
US 2016/0044151 A1 Feb. 11, 2016

Related U.S. Application Data

(63) Continuation of application No. PCT/US2013/032540, filed on Mar. 15, 2013.

(51) Int. Cl.
*H04M 1/725* (2006.01)
*H04M 19/02* (2006.01)
(Continued)

(52) U.S. Cl.
CPC ...... *H04M 1/7253* (2013.01); *G06F 3/04847* (2013.01); *G06F 3/165* (2013.01);
(Continued)

(58) Field of Classification Search
USPC .............................................. 455/556.1, 567
See application file for complete search history.

(56) References Cited

U.S. PATENT DOCUMENTS

| 206,860 A | 4/1877 | Burdick |
|---|---|---|
| 5,247,580 A | 9/1993 | Kimura et al. |

(Continued)

FOREIGN PATENT DOCUMENTS

| EP | 1 267 523 A1 | 12/2002 |
|---|---|---|
| EP | 1 443 665 A1 | 8/2004 |
| WO | 02/39703 A2 | 5/2002 |

OTHER PUBLICATIONS

International Search Report and Written Opinion dated Aug. 21, 2014 in PCT Application No. PCT/US14/28163, 12 pages.
(Continued)

*Primary Examiner* — Erica Fleming-Hall
(74) *Attorney, Agent, or Firm* — Kilpatrick Townsend & Stockton LLP

(57) ABSTRACT

A wearable device can facilitate automatic adjustment of a volume control and/or other settings of a host device based on properties of the ambient environment. For example, when a host device generates an audible alert, a wearable device can sample the ambient sound to detect a distinct contribution corresponding to the audible alert; if the contribution is outside acceptable levels, the wearable device can notify the host device to adjust the alert volume and/or other alert characteristics. Adjustments to host-device settings can also be made based on comparing audio signals collected by the host device and the wearable device.

18 Claims, 9 Drawing Sheets

(51) Int. Cl.
*H04M 1/02* (2006.01)
*H04M 19/04* (2006.01)
*G06F 3/0484* (2013.01)
*G06F 3/16* (2006.01)

(52) U.S. Cl.
CPC ........... *H04M 19/02* (2013.01); *H04M 19/04* (2013.01); *H04M 1/72552* (2013.01); *H04M 1/72583* (2013.01); *H04M 2250/12* (2013.01); *H04M 2250/22* (2013.01); *H04M 2250/74* (2013.01)

(56) References Cited

U.S. PATENT DOCUMENTS

| | | | |
|---|---|---|---|
| 5,267,323 A | 11/1993 | Kimura | |
| 6,006,115 A * | 12/1999 | Wingate | H04M 1/6033 379/110.01 |
| 6,044,279 A * | 3/2000 | Hokao | G08B 1/08 455/567 |
| 6,223,029 B1 | 4/2001 | Stenman et al. | |
| 8,442,595 B2 * | 5/2013 | Glebe | H04M 19/04 381/104 |
| 8,848,930 B2 * | 9/2014 | Lundin | H04M 19/044 381/107 |
| 2002/0068610 A1 | 6/2002 | Anvekar et al. | |
| 2002/0076033 A1 * | 6/2002 | Baweja | H04M 19/044 379/373.01 |
| 2002/0131607 A1 * | 9/2002 | Belenger | H03G 3/301 381/110 |
| 2004/0127197 A1 * | 7/2004 | Roskind | H04M 1/72566 455/412.2 |
| 2004/0218768 A1 | 11/2004 | Zhurin et al. | |
| 2005/0027522 A1 * | 2/2005 | Yamamoto | G10L 15/20 704/233 |
| 2005/0282590 A1 * | 12/2005 | Haparnas | H04M 19/044 455/570 |
| 2006/0073819 A1 * | 4/2006 | Lowles | H04M 1/6041 455/418 |
| 2007/0037605 A1 * | 2/2007 | Logan | G08B 13/1427 455/567 |
| 2008/0102902 A1 * | 5/2008 | Epley | H04M 19/044 455/567 |
| 2009/0016540 A1 | 1/2009 | Heningsen Nielsen et al. | |
| 2009/0290718 A1 * | 11/2009 | Kahn | H03G 3/32 381/57 |
| 2010/0034395 A1 * | 2/2010 | Lundin | H04M 19/044 381/57 |
| 2010/0167795 A1 * | 7/2010 | Huang | H04M 1/72563 455/567 |
| 2011/0053491 A1 * | 3/2011 | Bolton | H04H 60/73 455/3.06 |
| 2011/0182441 A1 * | 7/2011 | Coffman | G06F 3/165 381/107 |
| 2012/0039489 A1 * | 2/2012 | Chen | H03G 3/32 381/107 |
| 2012/0093329 A1 * | 4/2012 | Francart | A61N 1/36032 381/60 |
| 2012/0231849 A1 * | 9/2012 | Yamashita | H04M 1/0245 455/566 |

OTHER PUBLICATIONS

International Search Report and Written Opinion dated Dec. 13, 2013 in PCT Application No. PCT/US2013/032540, 11 pages.

* cited by examiner

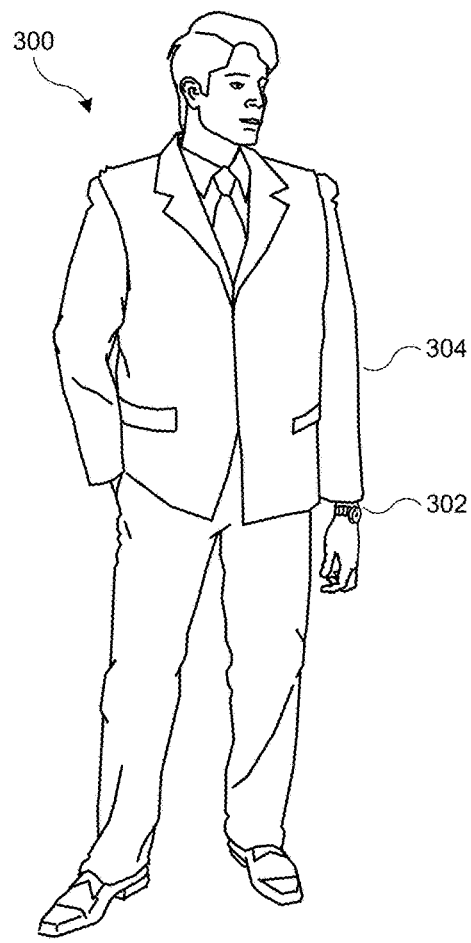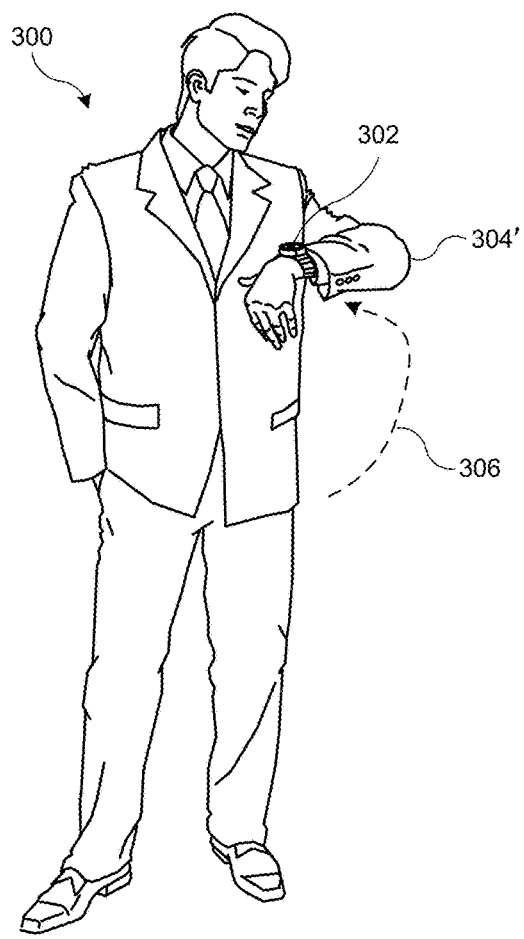
FIG. 3A
FIG. 3B

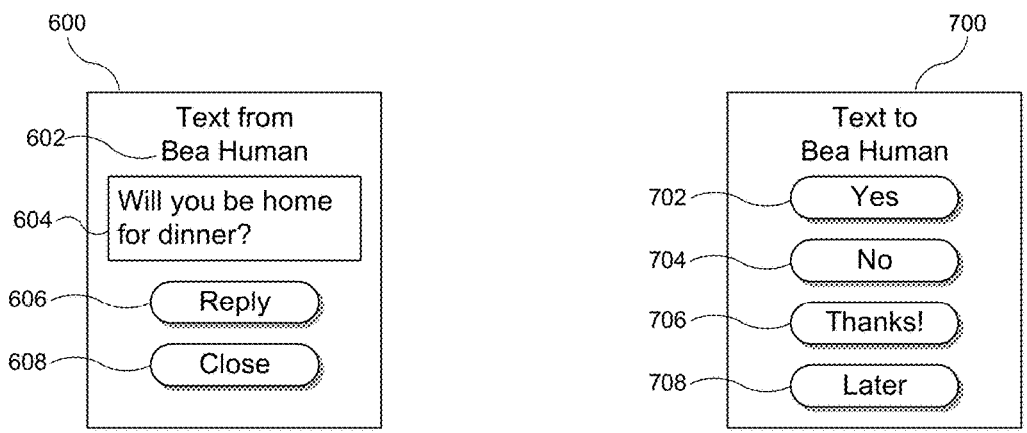
FIG. 6
FIG. 7
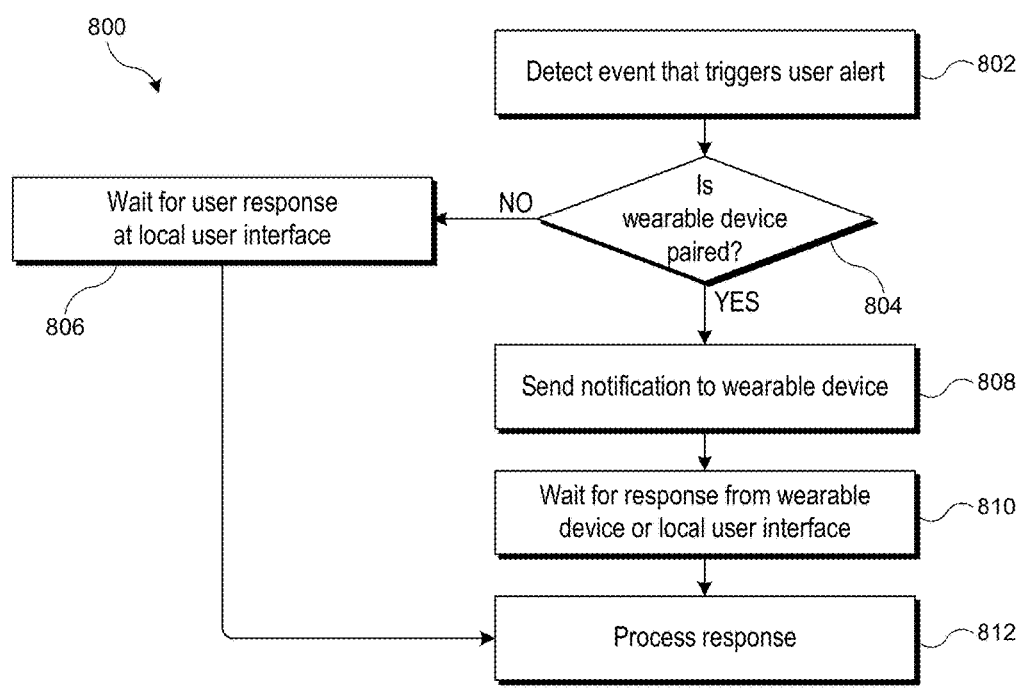
FIG. 8

VOLUME CONTROL FOR MOBILE DEVICE USING A WIRELESS DEVICE

CROSS-REFERENCE TO RELATED APPLICATIONS

This application is a U.S. National Phase under 35 USC 371 of PCT Application No. PCT/US2014/028163, filed Mar. 14, 2015, entitled "Volume Control for Mobile Device Using a Wireless Device," which claims priority to commonly-owned International Application No. PCT/US2013/032540, filed Mar. 15, 2013, entitled "Volume Control for Mobile Device Using a Wireless Device," the disclosures of which are incorporated herein by reference in their entirety.

BACKGROUND

The present disclosure relates generally to wireless electronic devices and in particular to providing a volume control for a mobile host device using another wireless device.

Mobile electronic devices, such as mobile phones, smart phones, tablet computers, media players, and the like, have become quite popular. Many users carry a device almost everywhere they go and use their devices for a variety of purposes, including making and receiving phone calls, sending and receiving text messages and emails, navigation (e.g., using maps and/or a GPS receiver), purchasing items in stores (e.g., using contactless payment systems), and/or accessing the Internet (e.g., to look up information).

However, the common use and possession of mobile device makes it difficult for manufacturers or users to identify most appropriate and pleasing settings. For example, a desired alert volume can differ dramatically based on whether a user is in his office with his device on his desk or in a crowded subway with his device in his pocket. Despite these distinct preferences, a user can keep an alert volume fixed in order to avoid the inconvenience of changing the setting or due to forgetfulness.

SUMMARY

Certain embodiments of the present invention relate to wearable electronic devices that can be connected (e.g., via wireless pairing) with another device (referred to herein as a "host device"), such as a smart phone, other mobile phone, tablet computer, media player, laptop computer, or the like. When paired, the wearable device can provide access to various functionalities of the host device.

Certain embodiments of the present invention relate to using a wearable device to facilitate automatic adjustment of a volume control and/or other settings of a host device based on properties of the ambient environment. For example, when a host device generates an audible alert (e.g., a ring tone indicating an incoming call), a wearable device that has a microphone can use its microphone to sample the ambient sound and attempt to detect a distinct contribution corresponding to the audible alert. If this contribution cannot be detected or is not sufficiently strong, the wearable device can notify the host device, and the host device can adjust the alert, e.g., by increasing the volume, adding or increasing the strength of a vibrational component of the alert, or the like. Similarly, if the contribution of the alert to the signal is too strong, the wearable device can notify the host device, and the host device can adjust the alert, e.g., by decreasing the volume.

In some embodiments, host device behavior can also be adjusted based on comparing the ambient sounds around the host device and the wearable device. For instance, a wearable device is likely to be relatively exposed to the ambient air while it is being worn, while a host device might be exposed to ambient air or shielded to varying degrees from ambient air by a sonic "barrier," depending on how it is being carried or stowed. Thus, ambient sound around a wearable device (at least while it is being worn) can provide a relatively constant baseline to which ambient sound around a host device can be compared, allowing inferences about whether and to what degree a barrier is present. Further, since sound transmission by the host will be rendered less effective to the extent a sonic barrier is present, the host device can use inferences about its degree of exposure or protection to adjust its sound transmissions (e.g., increasing volume if a strong sonic barrier is detected or decreasing volume if no sonic barrier is detected).

Other comparisons of sound can be used for other purposes, such as adjusting speech detection algorithms in the host device to account for environmental sounds that may interfere with speech detection.

In some embodiments, a wearable device can collect a first audio signal (e.g., using a microphone) and extract a first component of the first audio signal. The wearable device can determine a property of the first component; this property can be any property indicative of a strength of a contribution of a reference signal to the first audio signal; examples include a sound intensity, a signal amplitude, and/or a power or frequency spectrum. Based on the determined property, the wearable device, can generate a message instructing a paired host device to adjust a setting and send the message to the host device. For instance, if the strength of the contribution of the reference signal is low, the wearable device can instruct the host device to increase a volume setting for a sound it generates; if the strength is high, the wearable device can instruct the host device to decrease the volume setting.

For example, the wearable device can receive a notification from the host device indicating that the host device (which can be, e.g., a mobile phone) is sounding or is about to sound an alert (e.g., a ringtone indicative of an incoming call) and can collect the first audio signal in response to receiving the notification. In this case, the reference signal corresponds to the alert sound generated by the host device (which can be communicated to the wearable device with or in advance of the notification). The setting of the host device to be adjusted can include a volume of the alert sound.

As another example, the reference signal can correspond to a signal collected by the host device, and the first audio signal and the reference audio signal can be collected at substantially the same time.

In some embodiments, a host device can perform signal comparison analysis. For example, the host device can collect a first audio signal (e.g., using its own a microphone), extract a component of the first audio signal, and analyze the extracted component to determine characterizing data for the first audio signal. The host device can receive, from a wearable device paired with the host device, a wireless transmission including characterizing data for a second audio signal; this can be an audio signal that was collected by the wireless device substantially simultaneously with the host device collecting the first audio signal. To synchronize the signal collection, prior to starting its own audio signal collection, the host device can send a message instructing the wearable device to start collecting an audio signal. The host device can compare the characterizing data for the first audio signal with the characterizing data for the second audio signal to determine a difference measure and can adjust a setting of the host device based on the difference measure. Various types of characterizing data and difference measures can be used. For example, the characterizing data can include a power at each of a plurality of frequency bands and the difference measure includes a difference in average power between the first and second audio signals, and the host device can adjust a volume setting (e.g., for an alert that it sounds) if the difference in average power is greater than a threshold value. As another example, the characterizing data of each of the first and second audio signals includes a mean amplitude over a time interval and the difference measure includes a difference in mean amplitude between the first and second audio signals, and the host device can adjust a volume setting (e.g., for an alert that it sounds) if the difference in mean amplitude is greater than a threshold value. As yet another example, the characterizing data can include peak and phase data, and a speech-detection setting of the host device can be adjusted based on a phase delay between the first audio signal and the second audio signal.

The following detailed description together with the accompanying drawings will provide a better understanding of the nature and advantages of the present invention.

BRIEF DESCRIPTION OF THE DRAWINGS

FIGS. 3A and 3B illustrate a user operating a wearable device according to an embodiment of the present invention.

FIG. 6 illustrates another interface for alerting a user according to an embodiment of the present invention.

FIG. 7 illustrates a user interface for selecting a predefined message according to an embodiment of the present invention.

FIG. 8 is a flow diagram of a process for generating an event notification and receiving a response according to an embodiment of the present invention.

DETAILED DESCRIPTION

Certain embodiments of the present invention relate to wearable electronic devices that can be connected (e.g., via wireless pairing) with another device (referred to herein as a "host device"), such as a smart phone, other mobile phone, tablet computer, media player, laptop computer, or the like. When paired, the wearable device can provide access to various functionality of the host device.

Figure 1:
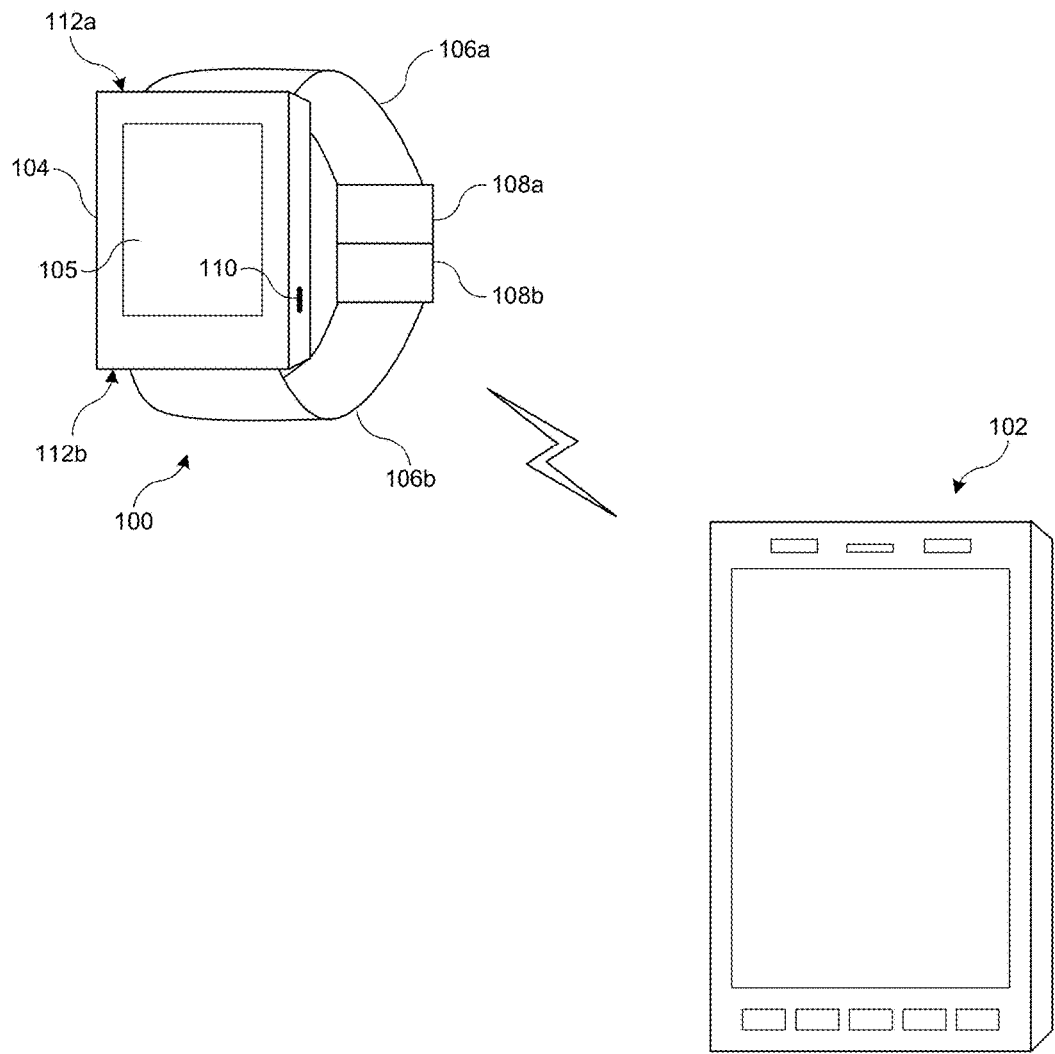
FIG. 1 shows a wearable device communicating wirelessly with a host device according to an embodiment of the present invention.

FIG. 1 shows a wearable device 100 communicating wirelessly with a host device 102 according to an embodiment of the present invention. In this example, wearable device 100 is shown as a wristwatch-like device with a face portion 104 connected to straps 106a, 106b.

Face portion 104 can include, e.g., a touchscreen display 105 that can be appropriately sized depending on where on a user's person wearable device 100 is intended to be worn. A user can view information presented by wearable device 100 on touchscreen display 105 and provide input to wearable device 100 by touching touchscreen display 105. In some embodiments, touchscreen display 105 can occupy most or all of the front surface of face portion 104.

Straps 106a, 106b can be provided to allow device 100 to be removably worn by a user, e.g., around the user's wrist. In some embodiments, straps 106a, 106b can be made of any flexible material (e.g., fabrics, flexible plastics, leather, chains or flexibly interleaved plates or links made of metal or other rigid materials) and can be connected to face portion 104, e.g., by hinges. Alternatively, straps 106a, 106b can be made of a rigid material, with one or more hinges positioned at the junction of face 104 and proximal ends 112a, 112b of straps 106a, 106b and/or elsewhere along the lengths of straps 106a, 106b to allow a user to put on and take off wearable device 100. Different portions of straps 106a, 106b can be made of different materials; for instance, flexible or expandable sections can alternate with rigid sections. In some embodiments, one or both of straps 106a, 106b can include removable sections, allowing wearable device 100 to be resized to accommodate a particular user's wrist size. In some embodiments, straps 106a, 106b can be portions of a continuous strap member that runs behind or through face portion 104. Face portion 104 can be detachable from straps 106a, 106b; permanently attached to straps 106a, 106b; or integrally formed with straps 106a, 106b.

The distal ends of straps 106a, 106b opposite face portion 104 can provide complementary clasp members 108a, 108b that can be engaged with each other to secure the distal ends of straps 106a, 106b to each other, forming a closed loop. In this manner, device 100 can be secured to a user's person, e.g., around the user's wrist; clasp members 108a, 108b can be subsequently disengaged to facilitate removal of device 100 from the user's person. The design of clasp members 108a, 108b can be varied; in various embodiments, clasp members 108a, 108b can include buckles, magnetic clasps, mechanical clasps, snap closures, etc. In some embodiments, one or both of clasp members 108a, 108b can be movable along at least a portion of the length of corresponding strap 106a, 106b, allowing wearable device 100 to be resized to accommodate a particular user's wrist size.

Straps 106a, 106b can be two distinct segments, or they can be formed as a continuous band of an elastic material (including, e.g., elastic fabrics, expandable metal links, or a combination of elastic and inelastic sections), allowing wearable device 100 to be put on and taken off by stretching a band formed straps 106a, 106b. In such embodiments, clasp members 108a, 108b can be omitted.

Straps 106a, 106b and/or clasp members 108a, 108b can include sensors that allow wearable device 100 to determine whether it is being worn at any given time. Wearable device 100 can operate differently depending on whether it is currently being worn or not. For example, wearable device 100 can inactivate various user interface and/or RF interface components when it is not being worn. In addition, in some embodiments, wearable device 100 can notify host device 102 when a user puts on or takes off wearable device 100.

Host device 102 can be any device that communicates with wearable device 100. In FIG. 1, host device 102 is shown as a smart phone; however, other host devices can be substituted, such as a tablet computer, a media player, any type of mobile phone, a laptop or desktop computer, or the like. Other examples of host devices can include point-of-sale terminals, security systems, environmental control systems, and so on. Host device 102 can communicate wirelessly with wearable device 100, e.g., using protocols such as Bluetooth or Wi-Fi. In some embodiments, wearable device 100 can include an electrical connector 110 that can be used to provide a wired connection to host device 102 and/or to other devices, e.g., by using suitable cables. For example, connector 110 can be used to connect to a power supply to charge an onboard battery of wearable device 100.

In some embodiments, wearable device 100 and host device 102 can interoperate to enhance functionality available on host device 102. For example, wearable device 100 and host device 102 can establish a pairing using a wireless communication technology such as Bluetooth. While the devices are paired, host device 102 can send notifications of selected events (e.g., receiving a phone call, text message, or email message) to wearable device 100, and wearable device 100 can present corresponding alerts to the user. Wearable device 100 can also provide an input interface via which a user can respond to an alert (e.g., to answer a phone call or reply to a text message). In some embodiments, wearable device 100 can also provide a user interface that allows a user to initiate an action on host device 102, such as placing a phone call, sending a text message, or controlling media playback operations of host device 102. Techniques described herein can be adapted to allow a wide range of host device functions to be enhanced by providing an interface via wearable device 100.

It will be appreciated that wearable device 100 and host device 102 are illustrative and that variations and modifications are possible. For example, wearable device 100 can be implemented in any wearable article, including a watch, a bracelet, a necklace, a ring, a belt, a jacket, or the like. In some instances, wearable device 100 can be a clip-on device or pin-on device that has a clip or pin portion that attaches to the user's clothing. The interface portion (including, e.g., touchscreen display 105) can be attached to the clip or pin portion by a retractable cord, and a user can easily pull touchscreen display 105 into view for use without removing the clip or pin portion, then let go to return wearable device 100 to its resting location. Thus, a user can wear device 100 in any convenient location.

Figure 2:
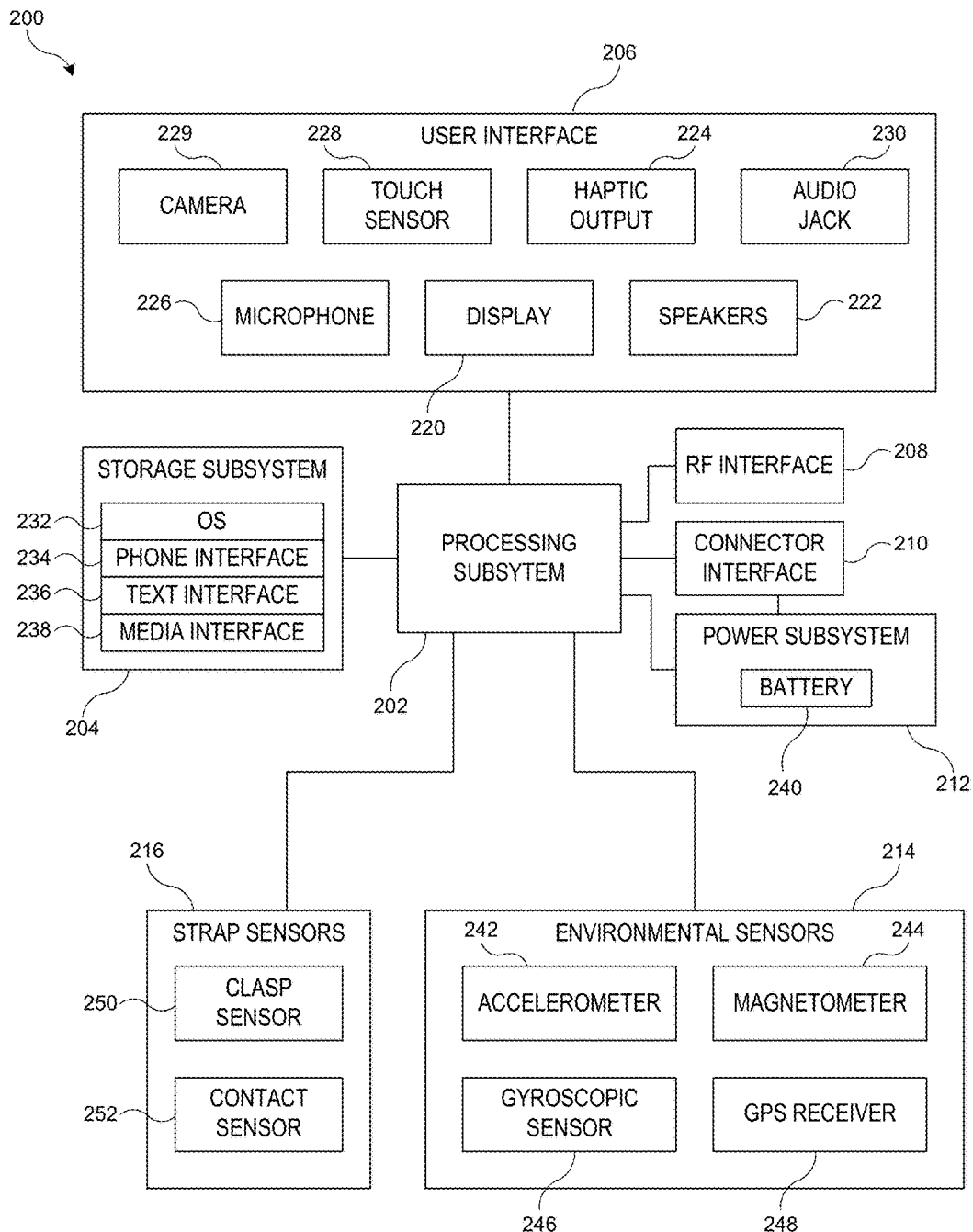
FIG. 2 is a simplified block diagram of a wearable device according to an embodiment of the present invention.

Wearable device 100 can be implemented using electronic components disposed within face portion 104, straps 106a, 106b, and/or clasp members 108a, 108b. FIG. 2 is a simplified block diagram of a wearable device 200 (e.g., implementing wearable device 100) according to an embodiment of the present invention. Wearable device 200 can include processing subsystem 202, storage subsystem 204, user interface 206, RF interface 208, connector interface 210, power subsystem 212, environmental sensors 214, and strap sensors 216. Wearable device 200 can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 204 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 204 can also store one or more application programs to be executed by processing subsystem 210 (e.g., video game programs, personal information management programs, media playback programs, interface programs associated with particular host devices and/or host device functionalities, etc.).

User interface 206 can include any combination of input and output devices. A user can operate input devices of user interface 206 to invoke the functionality of wearable device 200 and can view, hear, and/or otherwise experience output from wearable device 200 via output devices of user interface 206.

Examples of output devices include display 220, speakers 222, and haptic output generator 224. Display 220 can be implemented using compact display technologies, e.g., LCD (liquid crystal display), LED (light-emitting diode), OLED (organic light-emitting diode), or the like. In some embodiments, display 220 can incorporate a flexible display element or curved-glass display element, allowing wearable device 200 to conform to a desired shape. One or more speakers 222 can be provided using small-form-factor speaker technologies, including any technology capable of converting electronic signals into audible sound waves. In some embodiments, speakers 222 can be used to produce tones (e.g., beeping or ringing) and can but need not be capable of reproducing sounds such as speech or music with any particular degree of fidelity. Haptic output generator 224 can be, e.g., a device that converts electronic signals into vibrations; in some embodiments, the vibrations can be strong enough to be felt by a user wearing wearable device 200 but not so strong as to produce distinct sounds.

Examples of input devices include microphone 226, touch sensor 228, and camera 229. Microphone 226 can include any device that converts sound waves into electronic signals. In some embodiments, microphone 226 can be sufficiently sensitive to provide a representation of specific words spoken by a user; in other embodiments, microphone 226 can be usable to provide indications of general ambient sound levels without necessarily providing a high-quality electronic representation of specific sounds.

Touch sensor 228 can include, e.g., a capacitive sensor array with the ability to localize contacts to a particular point or region on the surface of the sensor and in some instances, the ability to distinguish multiple simultaneous contacts. In some embodiments, touch sensor 228 can be overlaid over display 220 to provide a touchscreen interface (e.g., touchscreen interface 105 of FIG. 1), and processing subsystem 202 can translate touch events (including taps and/or other gestures made with one or more contacts) into specific user inputs depending on what is currently displayed on display 220.

Camera 229 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by wearable device 200 to other devices for storage. Depending on implementation, the optical components can provide fixed focal distance or variable focal distance; in the latter case, autofocus can be provided. In some embodiments, camera 229 can be disposed along an edge of face member 104 of FIG. 1, e.g., the top edge, and oriented to allow a user to capture images of nearby objects in the environment such as a bar code or QR code. In other embodiments, camera 229 can be disposed on the front surface of face member 104, e.g., to capture images of the user. Zero, one, or more cameras can be provided, depending on implementation.

In some embodiments, user interface 206 can provide output to and/or receive input from an auxiliary device such as a headset. For example, audio jack 230 can connect via an audio cable (e.g., a standard 2.5-mm or 3.5-mm audio cable) to an auxiliary device. Audio jack 230 can include input and/or output paths. Accordingly, audio jack 230 can provide audio to the auxiliary device and/or receive audio from the auxiliary device. In some embodiments, a wireless connection interface can be used to communicate with an auxiliary device.

Processing subsystem 202 can be implemented as one or more integrated circuits, e.g., one or more single-core or multi-core microprocessors or microcontrollers, examples of which are known in the art. In operation, processing system 202 can control the operation of wearable device 200. In various embodiments, processing subsystem 202 can execute a variety of programs in response to program code and can maintain multiple concurrently executing programs or processes. At any given time, some or all of the program code to be executed can be resident in processing subsystem 210 and/or in storage media such as storage subsystem 204.

Through suitable programming, processing subsystem 202 can provide various functionality for wearable device 200. For example, in some embodiments, processing subsystem 202 can execute an operating system (OS) 232 and various applications for interfacing with a host device, such as a phone-interface application 234, a text-interface application 236, and/or a media interface application 238. In some embodiments, some or all of these application programs can interact with a host device, e.g., by generating messages to be sent to the host device and/or by receiving and interpreting messages from the host device. In some embodiments, some or all of the application programs can operate locally to wearable device 200. For example, if wearable device 200 has a local media library stored in storage subsystem 204, media interface application 238 can provide a user interface to select and play locally stored media items. Examples of interface applications are described below.

RF (radio frequency) interface 208 can allow wearable device 200 to communicate wirelessly with various host devices. RF interface 208 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 208 can be implemented using a combination of hardware (e.g., driver circuits, antennas, modulators/demodulators, encoders/decoders, and other analog and/or digital signal processing circuits) and software components. In some embodiments, RF interface 208 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 208.

Connector interface 210 can allow wearable device 200 to communicate with various host devices via a wired communication path, e.g., using Universal Serial Bus (USB), universal asynchronous receiver/transmitter (UART), or other protocols for wired data communication. In some embodiments, connector interface 210 can provide a power port, allowing wearable device 200 to receive power, e.g., to charge an internal battery. For example, connector interface 210 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from host device 202 in analog and/or digital formats.

In some embodiments, connector interface 210 and/or RF interface 208 can be used to support synchronization operations in which data is transferred from a host device to wearable device 200 (or vice versa). For example, as described below, a user can customize certain information for wearable device 200 (e.g., a "favorite" contacts list and/or specific predefined text messages that can be sent). While user interface 206 can support data-entry operations, a user may find it more convenient to define customized information on a separate device (e.g., a tablet or smartphone) that has a larger interface (e.g., including a real or virtual alphanumeric keyboard), then transfer the customized information to wearable device 200 via a synchronization operation. Synchronization operations can also be used to load and/or update other types of data in storage subsystem 204, such as media items, application programs, and/or operating system programs. Synchronization operations can be performed in response to an explicit user request and/or automatically, e.g., when wireless device 200 resumes communication with a particular host device or in response to either device receiving an update to its copy of synchronized information.

Environmental sensors 214 can include various electronic, mechanical, electromechanical, optical, or other devices that provide information related to external conditions around wearable device 200. Sensors 214 in some embodiments can provide digital signals to processing subsystem 202, e.g., on a streaming basis or in response to polling by processing subsystem 202 as desired. Any type and combination of environmental sensors can be used; shown by way of example are accelerometer 242, a magnetometer 244, a gyroscope 246, and a GPS receiver 248.

Some environmental sensors can provide information about the location and/or motion of wearable device 200. For example, accelerometer 242 can sense acceleration (relative to freefall) along one or more axes, e.g., using piezoelectric or other components in conjunction with associated electronics to produce a signal. Magnetometer 244 can sense an ambient magnetic field (e.g., Earth's magnetic field) and generate a corresponding electrical signal, which can be interpreted as a compass direction. Gyroscopic sensor 246 can sense rotational motion in one or more directions, e.g., using one or more MEMS (micro-electro-mechanical systems) gyroscopes and related control and sensing circuitry. Global Positioning System (GPS) receiver 248 can determine location based on signals received from GPS satellites.

Other sensors can also be included in addition to or instead of these examples. For example, a sound sensor can incorporate microphone 226 together with associated circuitry and/or program code to determine, e.g., a decibel level of ambient sound. Temperature sensors, proximity sensors, ambient light sensors, or the like can also be included.

Strap sensors 216 can include various electronic, mechanical, electromechanical, optical, or other devices that provide information as to whether wearable device 200 is currently being worn. For instance, clasp sensor 250 can be at least partially disposed within either or both of clasp members 108a, 108b of FIG. 1 and can detect when clasp members 108a, 108b are engaged with each other or disengaged from each other. For example. engaging clasp members 108a, 108b to each other can complete an electrical circuit, allowing current to flow through clasp sensor 250; disengaging clasp members 108a, 108b from each other can break the circuit. As another example, one or more contact sensors 252 can be disposed in straps 106a, 106b and can detect contact with a user's skin, e.g., based on capacitive sensing, galvanic skin response, or the like. Contact sensors 252 can also include pressure sensors (e.g., piezoelectric devices) or the like. Any other type of sensor that indicates whether wearable device 200 is currently being worn can be used in addition to or instead of strap sensors 216. For instance, physiological or biometric sensors, such as pulse sensors, ECG sensors, or the like can be provided. In some embodiments, physiological or biometric sensors can be used in verifying the identity of the wearer of wearable device 200.

Power subsystem 212 can provide power and power management capabilities for wearable device 200. For example, power subsystem 212 can include a battery 240 (e.g., a rechargeable battery) and associated circuitry to distribute power from battery 240 to other components of wearable device 200 that require electrical power. In some embodiments, power subsystem 212 can also include circuitry operable to charge battery 240, e.g., when connector interface 210 is connected to a power source. In some embodiments, power subsystem 212 can include a "wireless" charger, such as an inductive charger, to charge battery 240 without relying on connector interface 210. In some embodiments, power subsystem 212 can also include other power sources, such as a solar cell, in addition to or instead of battery 240.

In some embodiments, power subsystem 212 can control power distribution to components within wearable device 200 to manage power consumption efficiently. For example, power subsystem 212 can automatically place device 200 into a "hibernation" state when strap sensors 216 indicate that device 200 is not being worn. The hibernation state can be designed to reduce power consumption; accordingly, user interface 206 (or components thereof), RF interface 208, connector interface 210, and/or environmental sensors 214 can be powered down (e.g., to a low-power state or turned off entirely), while strap sensors 216 are powered up (either continuously or at intervals) to detect when a user puts on wearable device 200. As another example, in some embodiments, while wearable device 200 is being worn, power subsystem 212 can turn display 220 and/or other components on or off depending on motion and/or orientation of wearable device 200 detected by environmental sensors 214. For instance, if wearable device 200 is designed to be worn on a user's wrist, power subsystem 212 can detect raising and rolling of a user's wrist, as is typically associated with looking at a wristwatch, based on information provided by accelerometer 242. In response to this detected motion, power subsystem 212 can automatically turn display 220 and/or touch sensor 228 on; similarly, power subsystem 212 can automatically turn display 220 and/or touch sensor 228 off in response to detecting that user's wrist has returned to a neutral position (e.g., hanging down).

Power subsystem 212 can also provide other power management capabilities, such as regulating power consumption of other components of wearable device 200 based on the source and amount of available power, monitoring stored power in battery 240, generating user alerts if the stored power drops below a minimum level, and so on.

In some embodiments, control functions of power subsystem 212 can be implemented using programmable or controllable circuits operating in response to control signals generated by processing subsystem 202 in response to program code executing thereon, or as a separate microprocessor or microcontroller.

It will be appreciated that wearable device 200 is illustrative and that variations and modifications are possible. For example, strap sensors 216 can be omitted, and wearable device 200 can include a user-operable control (e.g., a button or switch) that the user can operate to indicate when wearable device 200 is being worn. Controls can also be provided, e.g., to turn on or off display 220, mute or unmute sounds from speakers 222, etc. In some embodiments, other environmental sensors (e.g., accelerometer 242) can be used to determine whether wearable device 200 is being worn, in addition to or instead of strap sensors 216. Wearable device 200 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

A host device such as host device 102 of FIG. 1 can be implemented as an electronic device using blocks similar to those described above (e.g., processors, storage media, user interface devices, data communication interfaces, etc.) and/or or other blocks or components. Those skilled in the art will recognize that any electronic device capable of communicating with a particular wearable device can act as a host device with respect to that wearable device.

Communication between a host device and a wireless device can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

In some embodiments, wearable device 200 can detect a transition from an "idle" position to an "active" position. For example, FIGS. 3A and 3B illustrate a user 300 wearing wearable device 302, which in this example is a wrist-worn device. As shown in FIG. 3A, when user 300 is not actively using wearable device 302, the user's arm 304 may hang naturally at his side. To begin using wearable device 302, user 300 can rotate his arm to the position 304' shown in FIG. 3B, raising the elbow to bring wearable device 302 into his line of sight. Dashed line 306 indicates an approximate motion path of wearable device 302. Motion sensors (e.g., accelerometer 242 and/or gyroscopic sensor 246) can detect a characteristic motion associated with bringing wearable device 302 into the user's line of sight; upon detecting this motion, wearable device 302 can automatically prepare itself to be used, e.g., by activating user interface components such as display 220 and/or touch sensor 228. Other patterns of motion can also be detected and can trigger activation of user interface components; for example, shaking of the wrist or a specific motion pattern of the arm or hand (e.g., moving in an "S" curve or circle or triangle). In some embodiments, wearable device 302 (or other wearable devices described herein) can have a button (e.g., on the side of face 104 in FIG. 1) that a user can toggle to turn on or off a touchscreen interface; the button can be provided in addition to or instead of motion-based detection of activation.

Referring again to FIG. 1, in some embodiments, host device 102 can send various event notifications to wearable device 100, and the user can respond to the notifications via wearable device 100. For example, host device 102 can alert wearable device 100 to incoming communications such as phone calls, text messages, voicemail messages, email messages, and the like; upcoming meetings or events; stock market events such as change in price of a particular stock; location-based reminders; and/or any other event that can be identified by host device 102. In some embodiments, the user may be able to select which types of events should generate notifications to wearable device 102, e.g., by interacting with a settings menu provided on host device 102.

Figure 4:
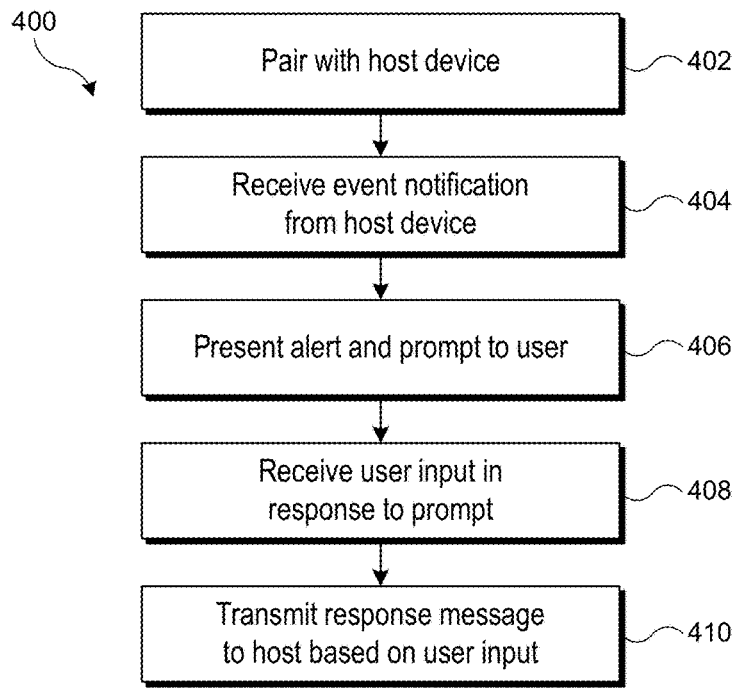
FIG. 4 is a flow diagram of a process for responding to an event notification according to an embodiment of the present invention.

FIG. 4 is a flow diagram of a process 400 for responding to an event notification according to an embodiment of the present invention. Process 400 can be implemented in a wearable device, e.g., wearable device 100 of FIG. 1 or wearable device 200 of FIG. 2, which can be interacting with host device 102. In some embodiments, the implementation of process 400 can include program code executed by a processor of wearable device 100.

At block 402, wearable device 100 can pair with a host device, e.g., host device 102. For example, standard Bluetooth pairing techniques can be used; other techniques for establishing a wireless connection between two devices can be used. In some embodiments, an initial pairing between two devices may involve user interaction with one or both devices to confirm that the pairing should be established. Once the initial pairing is established, the two devices can automatically reconnect to each other (without further user intervention) any time they come within communication range and are operating their respective RF transceivers.

At block 404, wearable device 100 can receive an event notification from host device 102. For example, host device 102 can send a notification indicating an incoming phone call, text message, or email message. At block 406, wearable device 100 can present an alert to the user and can prompt the user for a response. The alert can include, e.g., an audible alert, a vibration, a visual alert, or any combination of multiple alerts. The prompt can include, e.g., a visual prompt on display 220, an audio prompt (e.g., a voice prompt), or the like.

Figure 5:
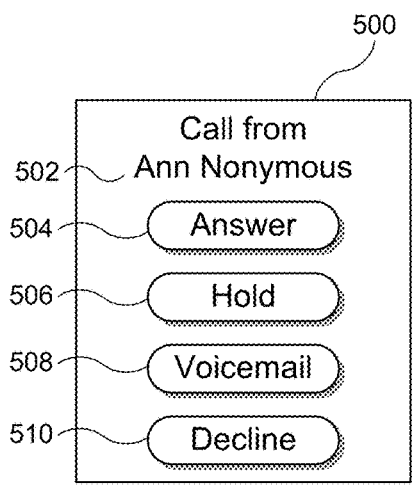
FIG. 5 illustrates an interface for alerting a user according to an embodiment of the present invention.

FIG. 5 illustrates an alert-and-prompt screen 500 that can be displayed at block 406 when the event notification corresponds to an incoming phone call. Screen 500 can show an identifier of the caller 502; the identifier can be determined by host device 102 (e.g., based on a contacts list stored therein and/or caller identifying information received by host device 102) and sent to wearable device 100 as part of the event notification. Screen 500 can also prompt the user to respond to the call, e.g., by selecting virtual button 504 to instruct the phone to answer the call, virtual button 506 to instruct the phone to place the caller on hold, virtual button 508 to instruct the phone to divert the call to voicemail, and virtual button 510 to decline the call. Other alerts and prompts can be used, depending on the type of event, available response options, screen size of the wearable device, user preferences, and similar design considerations.

In some embodiments, a sequence of screens can be presented as part of prompting the user for a response. For example, FIG. 6 illustrates a prompt screen 600 that can be displayed at block 406 of process 400 when the event notification corresponds to an incoming text message. Screen 600 shows an identifier of the sender of the text 602; as with a phone caller, the identifier of a sender of a text can be determined by host device 102 (e.g., based on a contacts list stored therein and/or source identifying information received by host device 102). Screen 600 can also show a preview of the text message 604; in some embodiments, the user can scroll (e.g., by sliding a finger up or down on a touchscreen) to view more message content. Screen 600 can also prompt the user to respond to the text, e.g., by selecting virtual button 606 to reply to the text or virtual button 608 to exit from screen 600 without responding.

If the user selects virtual button 606, a message selection screen 700 as shown in FIG. 7 can be displayed, providing a menu of predefined text messages from which the user can select. For example, virtual button 702 can be selected to send a "yes" message, virtual button 704 can be selected to send a "no" message; virtual button 706 can be selected to send a "thanks" message; and virtual button 708 can be selected to send a "later" message indicating that the user will contact the sender later. It is to be understood that buttons 702, 704, 706, 708 may not contain the full text message to be sent but rather a short identifier. For example, the "no" identifier on button 704 can be associated with a less terse message such as "No, sorry," and the "later" identifier on button 708 can be associated with a more specific message such as "I'll call you later."

Referring again to FIG. 4, at block 408, wearable device 100 can receive a user input in response to the prompt. For example, the user can select virtual buttons via one or more of screens 500, 600, or 700, depending on context and what the user desires to do. At block 410, wearable device 100 can transmit a response message to the host based on the received user input.

It is not required that a user actually respond to any particular alert on wearable device 100. For example, in some embodiments process 400 can simply time out and end at block 408 if the user does not provide input within some fixed time period (e.g., 1 minute, 2 minutes, 5 minutes); the time period can be different for different types of events. As another example, a user can select the "close" option (button 608) from a screen such as screen 600, and this can be interpreted by wearable device 100 as an indication that the user does not intend to respond. In some instances, a user may instead choose to respond to an alert by using host device 102 directly; in such cases, host device 102 can notify wearable device 100 if a response is received directly at host device 102.

FIG. 8 is a flow diagram of a process 800 for generating an event notification and receiving a response according to an embodiment of the present invention. Process 800 can be implemented in a host device, e.g., host device 102 of FIG. 1, which can be interacting with a wearable device 100 that executes process 400 of FIG. 4 or similar processes. In some embodiments, the implementation of process 800 can include program code executed by a processor of host device 102.

At block 802, host device 102 can detect an event that triggers a user alert, such as an incoming call or text message. At block 804, host device 102 can determine whether a wearable device (e.g., wearable device 100) is currently paired. If not, then at block 806, host device 102 can wait for a user input at its local interface to determine whether and how the user chooses to respond.

If wearable device 100 is currently paired, then at block 808, host device 102 can send an event notification to wearable device 100. Any communication protocol can be used, including standard Bluetooth messages (e.g., incoming call alert), a message that conforms to a customized serial protocol that can be transmitted using Bluetooth's virtual serial port capability, or messages conforming to other protocols that are mutually understood by the host device and the wearable device. The notification can include information identifying the type of event (e.g., incoming phone call, text message received, stock market alert, etc.) and additional details specific to the event (e.g., name or other identifier of the caller, content of a text message, etc.).

At block 810, host device 102 can wait for a response, which can come from either the wearable device or a local user interface of host device 102. For example, a user may receive an alert of an incoming call on wearable device 100 but choose to answer the call using host device 102. Accordingly, host device 102 can monitor activity on the connection to wearable device 100 to detect a response and at the same time present a local interface (e.g., on its own touchscreen display) and monitor that interface to detect a response.

At block 812, host device 102 can process the received response, regardless of whether it was received from wearable device 100 or via a local user interface of host device 102. For example, referring to FIG. 5, if a user selects one of virtual buttons 504, 506, 508, 510 from screen 500 on wearable device 100, host device 102 can receive a response from wearable device 100 indicating which button was selected. In response to answer button 504 being selected, host device 102 can answer the call; call audio can be routed to wearable device 100 or to another audio input/output device, such as an internal audio interface of host device 102 or a wireless headset that is paired with or otherwise in communication with host device 102. In response to hold button 506 being selected, host device 102 can answer the call and play a message to the caller indicating that the caller should hold. The user can later take the call off hold, e.g., via a local user interface of host device 102 or via wearable device 100, allowing the user to speak with the caller. In response to voicemail button 508 being selected, host device 102 can redirect the call to a voicemail account associated with the user, allowing the caller to leave a message. In response to decline button 510 being selected, host device 102 can reject or terminate the call.

As another example, referring to FIG. 7, if a user selects to reply to a text message with a predefined response, e.g., by selecting one of buttons 702, 704, 706, 708 on screen 700, host device 102 can generate and send the corresponding text message back to the sender. In some embodiments, wearable device 100 may provide an index or other short name as an identifier for the text message. Host device 102 can maintain a lookup table or other data structure that maps the identifier to the actual message to be sent (e.g., a short-name identifier such as "later" or an index such as "3" can be mapped to "I'll call you later," which is the message that would be sent). In some embodiments, a user can define a set of text messages to be included in the predefined list by interacting with host device 102, and host device 102 can provide short names and/or other identifiers for the user-defined messages to wearable device 100, e.g., in a synchronization operation.

It is not required that a user actually respond to a particular alert, either locally on host device 102 or via wearable device 100. In some instances, process 800 can allow the alert to time out after a specific period (e.g., 1 minute, 2 minutes, 5 minutes) if the user does not respond, in which case process 800 can end at block 806 or 810. For example, if an incoming call is not answered within the specified time period after generating the alert, host device 102 can take a default action such as diverting the call to a voicemail system. In some embodiments, if the user does not respond within the specified time period, host device 102 can discontinue the alert and/or replace the alert with an informational notice that is visible to the user (e.g., a missed-call notification or the like).

It will be appreciated that processes 400 and 800 are illustrative and that variations and modifications are possible. Steps described as sequential may be executed in parallel, order of steps may be varied, and steps may be modified, combined, added or omitted. For instance, in some embodiments, a host device can present a user alert via its own local interface in addition to sending a notification to a wearable device; in some embodiments, the host device presents a user alert via its own local user interface only when the wearable device is not paired; and in some embodiments, the user can specify whether the host should send a particular notification to the wearable device, present an alert locally, do both, or do neither. A user alert on a host device or a wearable device can take the form of any sensory input detectable by a human and can include visual alerts (e.g., lights; displayed text, icons and or images), audible alerts (e.g., tones, buzzes, ringtones, musical sounds, and/or speech sounds), and/or tactile alerts (e.g., a vibration).

The particular response options described above, e.g., with reference to FIGS. 5-7, are also illustrative, and the user may have other options for responding to a given alert. Further, while processes 400 and 800 have been described with reference to specific types of events (incoming call, incoming text message), it is to be understood that notifications of other types of events can be processed in the same manner. For any type of event, the user can have the option to select one of a set of responses (which may be limited) via the wearable device's user interface or to use the host device's local user interface to respond. In some instances, the host device's interface can offer a larger or different range of possible response options than the wearable device (e.g., composing an arbitrary message as opposed to selecting from a finite set of predefined messages).

Certain embodiments of the present invention relate to using a wearable device to facilitate automatic adjustment of a volume control and/or other settings of a host device based on properties of the ambient environment. For example, when a host device generates an audible alert (e.g., a ring tone indicating an incoming call), a wearable device that has a microphone can use its microphone to sample the ambient sound and attempt to detect a distinct contribution corresponding to the audible alert in the sound. If the alert's contribution cannot be detected or is not sufficiently strong, the wearable device can notify the host device, and the host device can adjust the alert, e.g., by increasing the volume, adding or increasing strength of a vibrational component of the alert, or the like. Similarly, if the alert's contribution is too strong, the wearable device can notify the host device, and the host device can adjust the alert, e.g., by decreasing the volume.

In some embodiments, host device behavior can also be adjusted based on comparing the ambient sounds around the host device and the wearable device. For instance, a wearable device is likely to be relatively exposed to the ambient air (the medium through which sounds propagate) while it is being worn, while a host device might be exposed to ambient air (e.g., if it is sitting on a table or resting in a shirt pocket) or shielded to varying degrees from ambient air by a sonic "barrier" (e.g., it may be in a purse, briefcase, backpack, coat pocket, under a pillow, etc.). Thus, ambient sound around a wearable device (at least while it is being worn) can provide a relatively constant baseline to which ambient sound around a host device can be compared, allowing inferences about whether and to what degree a barrier is present. Further, since sound transmission by the host will be rendered less effective to the extent a sonic barrier is present, the host device can use inferences about its degree of exposure or protection to adjust its sound transmissions (e.g., increasing volume if a strong sonic barrier is detected or decreasing volume if no sonic barrier is detected).

Other comparisons of sound can be used for other purposes, such as adjusting speech detection algorithms in the host device to account for environmental sounds that may interfere with speech detection.

Ambient-sound detection can be performed in a host device and/or a wireless device using a microphone. As used herein, "sound" refers generally to the physical phenomenon of pressure waves traveling through air (or other transmission media); in embodiments described herein, sound waves with frequencies detectable to human ears are of particular interest, although use of frequencies above and/or below the range of human hearing is not precluded. A microphone can be any device that is capable of detecting sound waves and generating an electrical signal (which can be analog or digital) representing the sound wave; such electrical signals are referred to herein as "audio signals."

In some embodiments, microphone 226 in wearable device 100 can collect audio signals. The audio signals can be analyzed in order to extract signal components from host device 102 (e.g., an alert sound) and/or signal components from a user (e.g., speech components). An intensity of one or both extracted components can be used to estimate whether a circumstance is amenable to strong propagation of sounds signals between host device 102 and the user (e.g., between a microphone of the host device 102 and the user's ear or between the user's mouth and a microphone 226 of host device 102). Settings of the host device 102 (e.g., an alert volume) can be appropriately adjusted based on this determination.

For example, host device 102 can be a mobile phone. A user can place the mobile phone in his bookbag, and the user can wear wearable device 100 on his wrist. When the phone receives a call, it can send an alert to wearable device 100 and can ring. Wearable device 100 can then turn on its microphone and "listen" for audio characteristics of the ring. If the ring is not detected or if its audio signals are faint, wearable device 100 can send a return signal to the mobile device causing the mobile device to increase its ring volume. Additionally or alternatively, both devices can simultaneously collect audio signals, and characterizing data can be extracted from each signal. The characterizing data can be compared. If the data from wearable device 100 indicates a substantially stronger signal than that from the mobile phone, the mobile phone can adjust its settings to improve the likelihood that the user can hear its alerts.

Figure 9:
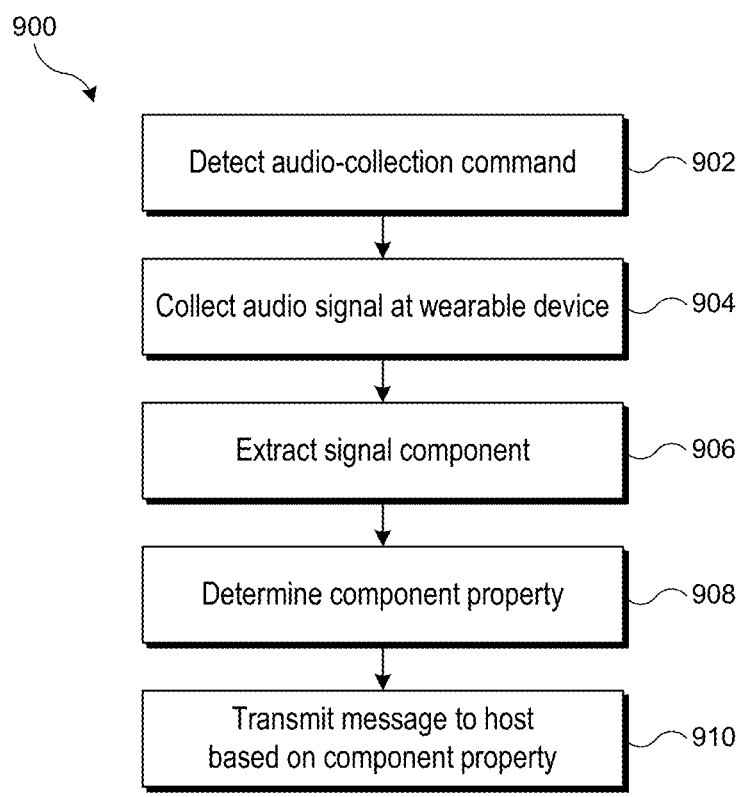
FIG. 9 is a flow diagram of a process for collecting and processing audio signals according to an embodiment of the present invention.

An audio signal collected by a microphone can be analyzed, e.g., by comparing it to a reference signal. FIG. 9 is a flow diagram of a process 900 for collecting and analyzing audio signals according to an embodiment of the present invention. Process 900 can be implemented in a wearable device, e.g., wearable device 100 of FIG. 1 or wearable device 200 of FIG. 2, which can be interacting with a host device, e.g., host device 102. In some embodiments, the implementation of process 900 can include program code executed by one or more processors of wearable device 100.

At block 902, an audio-collection command can be detected. This command can be one issued by wearable device 100, by host device 102, or by another remote device. In instances where the command is issued by an external device, the command can be received via RF interface 208. The command can be issued, for example, at routine intervals or at set times (e.g., on every hour). As other examples, the command can be issued upon a detection (e.g., at host device 102) that a user has not been interacting with host device 102 for a period of time or has not responded to a threshold number of alerts.

In some instances, the command includes no data. In other instances, the command can include data, such as data specifying when wearable device 100 is to collect an audio signal (e.g., start time and/or duration), or data indicative of a "reference" audio signal that is expected to be present during the collection of audio signals. Data in the command can indicate specific analyses to be performed and/or transmissions to be sent by wearable device 100. For example, the command can indicate that wearable device 100 is to determine whether it detects a sound signal at a particular frequency (the detection requiring a power above a threshold) and that wearable device 100 should notify host device 102 if the signal is not detected.

At block 904, an audio signal can be collected at wearable device 100. The audio signal can be collected via a microphone 226 of wearable device 100, such that surrounding sounds are converted from pressure waves to electrical signals. In some instances, collecting the audio signal includes activating microphone 226, e.g., for specific duration of time. In some instances, microphone 226 is already active, and an audio signal collected for a period of time is accessed. Collection of the audio signal can amount to collecting ambient sounds surrounding wearable device 100.

At block 906, a component of the audio signal can be extracted. For example, if the collected audio signal is a result of a combination of a sound of interest (e.g., a ring tone or a human speaking) and background sounds ("noise"), the extraction can be an effort to isolate a component that is usable to detect a contribution of the sound of interest to the collected audio signal. The component can include, e.g., a time-slice of an audio signal or a power distribution across a frequency range of interest. An audio signal can be collected as a temporal sequence of amplitude samples, which can be converted to samples in frequency space using a Fourier transform; accordingly, an audio signal can be analyzed in the time domain and/or the frequency domain to extract a component.

In some instances, the extraction can make use of known properties of another audio signal, referred to as a "reference" signal. For example, if the extraction includes an attempt to identify a portion of the audio signal that is attributable to a ring tone or human speech, the ring tone or speech pattern (or representative characteristics thereof) can be the reference signal. A frequency spectrum, temporal pattern and/or amplitude characteristics of the reference signal can be known in advance, and the extraction can include an attempt to distinguish a component of the audio signal that matches part or all of the frequency spectrum, temporal pattern and/or amplitude characteristics of the reference signal from a background spectrum or pattern. Various analyses can be employed. In one analysis, a frequency spectrum of the reference signal can have a pattern of peaks at one or more frequencies, and the extraction can include identifying peaks in a frequency spectrum of the ambient audio signal at the same or similar frequencies. In another analysis, the reference signal can have a predictable pattern of amplitude as a function of time (e.g., a ring tone that alternates a sound pattern with silences at regular intervals), and the extraction can include identifying intensities of the audio signal at discrete time periods (e.g., at intervals corresponding to the ring tone). In another analysis, the reference signal can be a "background" signal (e.g., a signal recorded when a sound of interest was not occurring), and the extraction can include filtering the collected audio signal based on the background signal, e.g., to remove or reduce noise. In another analysis, the reference signal can be an audio signal collected by a different device; for instance, wearable device 100 can compare simultaneously collected audio signals from its own microphone and from a microphone of another device, such as host device 102.

At block 908, a property of the extracted component can be determined. The property can include a maximum, average or median intensity or amplitude; an absolute or local maximum power in a frequency spectrum; or an absolute or relative power at a particular frequency. The property can also include a time (such as an offset time) or a phase in a frequency spectrum. The property can also be based on comparing multiple extracted components (e.g., power at a given frequency relative to a maximum, median, or average power; intensity at one or more given times relative to other times; time between local maxima in intensity; etc.). In some embodiments, the property can be indicative of whether and to what degree a contribution from the sound of interest is present in the extracted component.

At block 910, a message can be transmitted (e.g., via RF interface 208) from wearable device 100 to host device 102. The transmission can be conditioned on what property was determined at block 108 or can be unconditionally transmitted. For example, in one instance, a message is only sent if a determined property exceeds a threshold (e.g., being above a first threshold and/or being below a second threshold). The message can be substantially absent of data or can include data as desired. For example, the message can identify the determined property, or the message can indicate whether the determined property is such that host device 102 should adjust a setting (e.g., increase or decrease volume level). The message can generally indicate that this setting should be adjusted (e.g., a volume level should be increased) and/or can indicate a type of adjustment (e.g., an amount by which the volume level should be increased). Upon receiving the message, host device 102 can appropriately adjust one or more settings.

Process 900 allows host device 102 to collect information about audio signals likely present around a user. Specifically, it can be assumed that audio signals collected by wearable device 100 (at least while it is being worn) substantially mirror audio signals heard by the user. Therefore, if wearable device 100 cannot "hear" an alert (e.g., detecting the presence of the alert sound based on an amplitude or power analysis) sounded by host device 102, it can be reasonable to assume that the user can also not hear the alert. Similarly, if wearable device 100 can "hear" the user speaking, but host device 102 cannot, then it can be inferred that the user is not near host device 102 (or that host device 102 is behind some sort of sonic barrier). As another example, if ambient sound "heard" at host device 102 is similar to but generally lower intensity than, and/or selectively blocked in certain frequency ranges relative to, ambient sound "heard" at wearable device 100, it can be inferred that host device 102 is near the user but obstructed by a sonic barrier (for instance, host device 100 may be in a bag the user is carrying). Host device 102 can then adjust its settings accordingly. For example, if it is estimated that a user is not near host device 102 (or that host device 102 is behind a barrier), a volume of an alert can be adjusted. The volume can be increased in order to improve the probability that the user can hear the alert, and/or the volume can be decreased if sounding the alert seems futile (e.g., if host device 102 is "hearing" little or no sound). Conversely, if it is inferred that a user is near host device 102 (and that no barrier is present), an appropriate adjustment may include decreasing a loud alert volume or ensuring that host device 102 sounds an alert to indicate receipt of a communication (e.g., rather than merely vibrating or providing no indication).

Similarly, an alert type can be adjusted. For example, if RF transmissions indicate that wearable device 100 is proximate to host device 102 but wearable device 100 nonetheless has difficulty "hearing" alerts (e.g., due to a noisy environment), host device 102 can begin using tactile or haptic alerts (e.g., vibration) in addition to or instead of audio alerts. In some instances, host device 102 can also use received information to adjust power settings. For example, if audio signals collected at wearable device 100 and/or host device 102 suggest that a user will likely be unable to perceive alerts, host device 102 can enter an off, sleep or hibernation mode.

In some instances, process 900 can further includes a detection as to whether wearable device 100 is being worn (e.g., before block 904). If it is not being worn, process 900 can be at least temporarily terminated, on the assumption that a wearable device that is not being worn may not be a reliable detector of the sonic environment being experienced by the user.

It will be appreciated that process 900 is illustrative and that variations and modifications are possible. Steps described as sequential may be executed in parallel, order of steps may be varied, and steps may be modified, combined, added or omitted. Any type of signal analysis algorithm can be deployed to compare a recorded audio signal to a reference audio signal and/or to detect the presence (and/or strength) of a signal of interest against background noise. Signal processing and analysis can include, for example, filtering, noise reduction, frequency transforms, signal subtraction, and the like. Combinations of algorithms can also be used to extract and analyze multiple characteristics or components of a signal.

Further, while process 900 has been described as being performed by a wearable device, in some embodiments, portions of process 900 can be implemented in a host device. For example, a host device can collect an audio sample and transmit it to a wearable device for analysis (e.g., comparing to an audio sample collected by the wearable device). As another example, a host device can receive a collected audio sample from a wearable device and perform analysis using its own processor(s).

Figure 10:
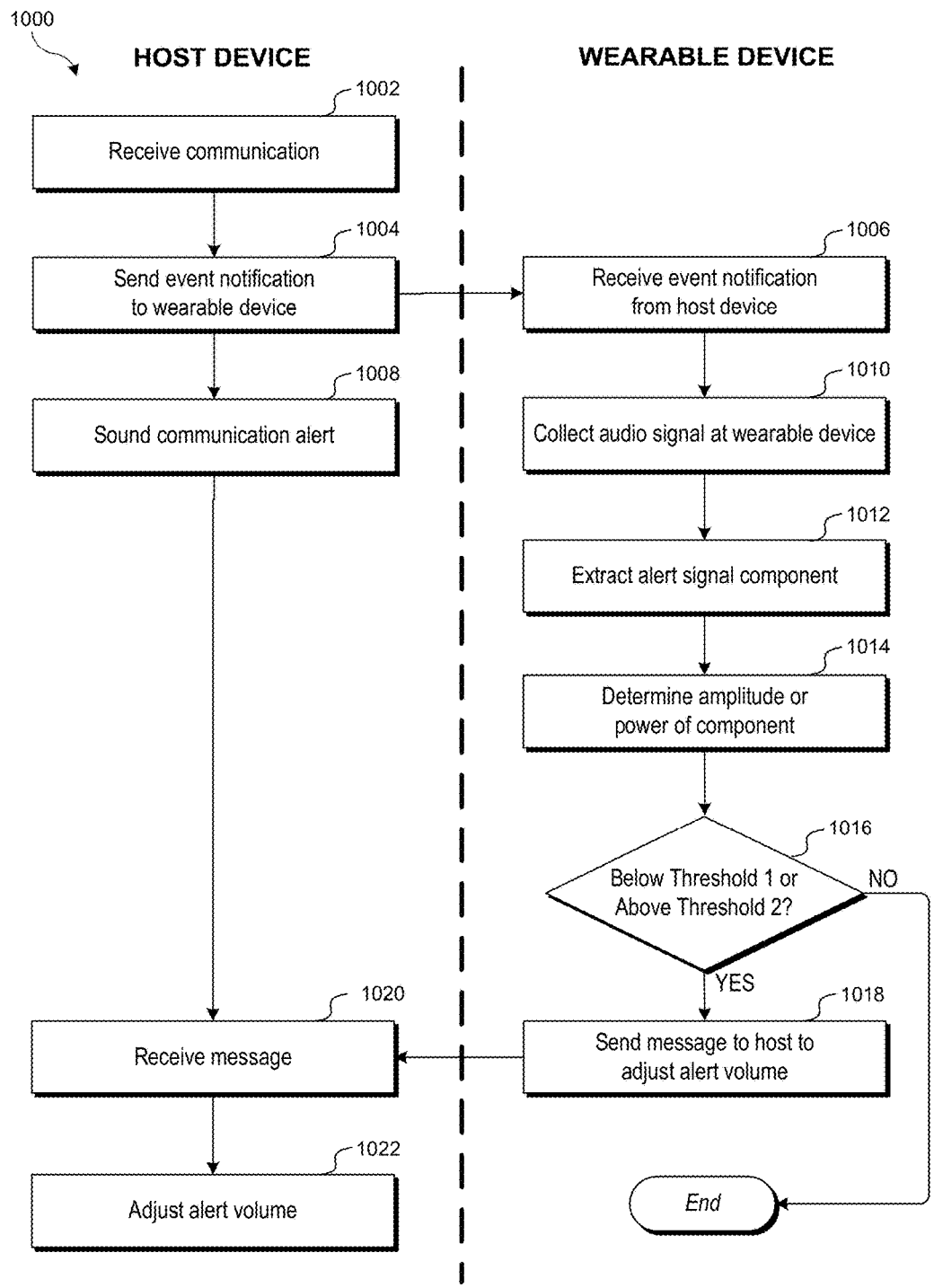
FIG. 10 is a flow diagram of a process for collecting an audio signal at a wearable device while sounding an alert at a host device according to an embodiment of the present invention.

Process 900 and similar processes can be applied in numerous contexts. One example, noted above, relates to adjusting an alert setting (e.g., volume level at which an alert is sounded) of a host device based on feedback from a wearable device. FIG. 10 is a flow diagram of a process 1000 for collecting an audio signal at a wearable device while sounding an alert at a host device according to an embodiment of the present invention. Part of process 1000 can be implemented in a wearable device, e.g., wearable device 100 of FIG. 1 or wearable device 200 of FIG. 2, and part of process 1000 can be implemented in host device 102. In some embodiments, the implementation of process 1000 can include program code executed by one or more processors of wearable device 100 and/or host device 102.

At block 1002, host device 102 can receive a communication. The communication can be, for example, a phone call, email or text message. The communication can be one likely to be of immediate interest to a user. The communication can be received over a network, such as a cellular network or data network.

At block 1004, host device 102 can send a notification to wearable device 100. The notification can indicate that host device 102 is about to sound or is sounding an alert. The notification can include a characteristic of the alert, such as a duration, a prominent frequency (or frequency spectrum), an inter-sound interval (e.g., for inter-ring intervals in a repeated ring tone), and/or relative or absolute times at which sounds in the alert will sound. The notification can also identify a condition, such that the wearable device is to evaluate the condition and send a return message if the condition is satisfied. At block 1006, the wearable device can receive the notification.

At block 1008, host device 102 can sound the alert. The alert can be indicative of the fact that the communication was received. The alert can include, e.g., a ringtone, such as a traditional telephone ring pattern, a segment of a song, or a series of tones. The type of alert can depend on the type of communication received. For example, an alert sounded in response to receipt of a text message can be different from an alert sounded in response to receipt of a phone call. A volume of the alert can be determined based on a current volume setting.

At block 1010, an audio signal can be collected at wearable device 100. At block 1012, an alert signal component can be extracted. This extraction can involve attempting to isolate a portion of the audio signal in which a contribution from the sounded alert is expected to be evident. At block 1014, the component can be analyzed to identify a contribution from the sounded alert, such as an amplitude characteristic of the sounded alert (e.g., a maximum amplitude) or a frequency characteristic of the sounded alert (e.g., a maximum power or power at a particular frequency). Blocks 1010, 1012, and 1014 can be similar or identical to blocks 904, 906, and 908 of process 900.

At decision block 1016, it is determined whether the contribution from the sounded alert (e.g., amplitude or power) identified at block 1014 exceeds a threshold. This inquiry can involve determining whether the amplitude or power is above a low threshold and/or whether the amplitude or power is below a high threshold. The low and/or high thresholds can be determined from data in the notification, from stored data, and/or using a learning paradigm (in which wearable device 100 and/or host device 102 can determine whether a user reverses automatic setting adjustments that were made based on past threshold analyses and can modify the threshold(s) accordingly).

If the amplitude or power is below the low threshold or above the high threshold, a message can be wirelessly transmitted from wearable device 100 to host device 102 at block 1018. Block 1018 can be similar or identical to block 910 of process 900. The message can include an indication as to whether a volume setting is to be increased (e.g., because the amplitude or power is below the low threshold) or decreased (e.g., because the amplitude or power is above the high threshold), and in some instances, the message indicates a magnitude by which the volume setting is to be adjusted. In some embodiments, the message includes no explicit indication as to a magnitude or direction for the adjustment; for instance, if there is only one threshold (e.g., a low threshold), the mere transmission of the message can indicate a direction of adjustment (e.g., increasing the volume) and the adjustment magnitude can be predefined. Host device 102 can receive the message at block 1020 and adjusts the alert volume accordingly at block 1022.

It will be appreciated that process 1000 described herein is illustrative and that variations and modifications are possible. Steps described as sequential may be executed in parallel, order of steps may be varied, and steps may be modified, combined, added or omitted. For instance, different analyses can be applied to the collected audio signal, and in some instances, the analysis can depend in part on the nature of the alert sound (e.g., a repetitive sound such as a traditional ringing-telephone sound can be analyzed temporally to look for periodic amplitude peaks, while a non-repetitive alert sound such as a song snippet can be analyzed in the frequency domain to detect characteristics of the song); results of temporal and frequency analyses can also be combined to determine the signal strength of the alert sound relative to background sounds.

The duration of the audio signal to be collected, characteristics of the signal component to be extracted, and/or specific parameters of the analysis can be varied as desired. In various embodiments, such features can be determined based on, e.g., information in the notification, stored information in wearable device 100 (e.g., information characterizing alert sounds used by the host device), and/or information from other transmissions from host device (e.g., updates sent when a user changes a selection of alert sounds).

Another example in which process 900 or similar processes can be applied relates to adjusting a setting of a host device based on comparing ambient sound between the host device and a wearable device. For instance, as noted above, if the wearable device is being worn, it is likely to be relatively exposed to ambient air while a host device may be shielded from ambient air by a sonic barrier. To the extent that the host device can determine whether and to what degree it is shielded, the host device can adjust its settings accordingly.

Figure 11:
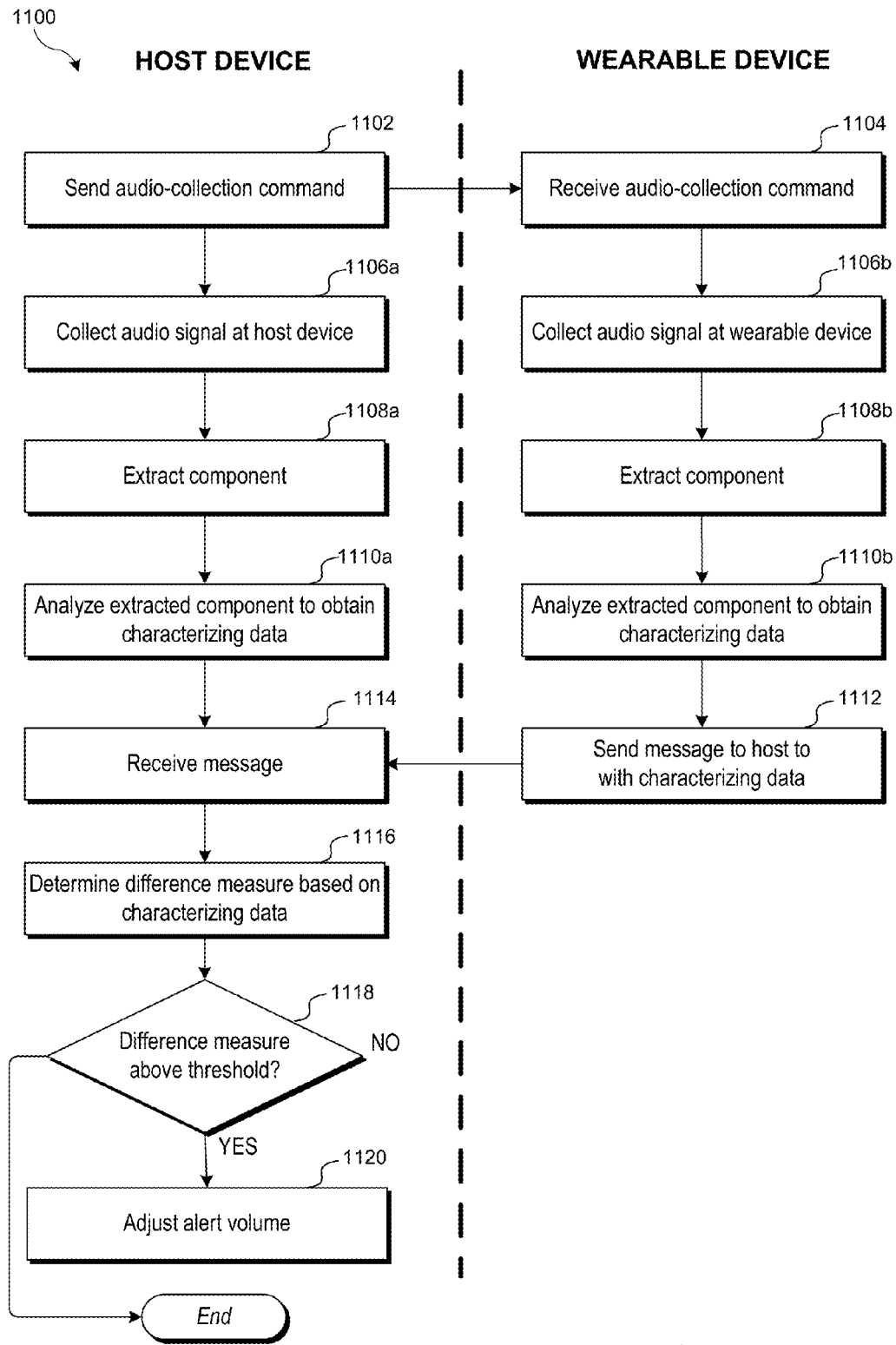
FIG. 11 is a flow diagram of a process for comparing simultaneously-collected audio signals at a wearable device and a host device according to an embodiment of the present invention.

FIG. 11 is a flow diagram of a process 1100 for comparing simultaneously collected audio signals at a wearable device and at a host device according to an embodiment of the present invention. Part of process 1100 can be implemented in a wearable device, e.g., wearable device 100 of FIG. 1 or wearable device 200 of FIG. 2, and part of process 1100 can be implemented in host device 102. In some embodiments, the implementation of process 1100 can include program code executed by one or more processors of wearable device 100 and/or host device 102.

At block 1102, host device 102 can wirelessly send an audio-collection command to wearable device 100. The command can be received at wearable device 100 at block 1104. The command can expressly or implicitly indicate that collection of audio data is to begin immediately. In some instances, the command can include a time at which audio-data collection should begin. The command can include a duration for audio-data collection and/or characteristics of a collected audio signal which are to be determined. For example, the command can identify one or more frequency bands of interest.

At blocks 1106a and 1106b, host device 102 and wearable device 100 each collect an audio signal. The signals can be collected during substantially the same period of time, such that collection begins at substantially the same time and ends at substantially the same time (e.g., within a few microseconds). In some embodiments, the effect of any discrepancy in timing can be accounted for in analysis.

At blocks 1108a and 1108b, host device 102 and wearable device 100 can each extract a component of interest from the collected audio signal. For example, if human speech is expected to be a prominent part of the sonic environment, the component of interest can be defined based on known characteristics of the human voice or speech generally or based on known characteristics of the voice or speech of a particular user. As another example, the component of interest can include a sampling of several bands within the frequency spectrum. As another example, the component of interest can be defined in the time domain, such as the signal amplitude or intensity. In some embodiments, the audio-collection command at block 1104 can specify the component to be extracted, and multiple components can be extracted.

At blocks 1110a and 1110b, host device 102 and wearable device 100 can each analyze the extracted component to generate data characterizing the signal. For example, if the component corresponds to a frequency band, blocks 1110a and 1110b can include identifying frequencies in the band having absolute or local peak powers. The powers at these peaks can further be identified. If the component corresponds to a temporal component, blocks 1110a and 1110b can include calculating an average or median amplitude and/or other statistical measures (e.g., a range, standard deviation, etc.) to characterize the signal.

At block 1112, a message identifying the results of the analysis is wirelessly transmitted from wearable device 100 to host device 102, and the message is received at host device 102 at block 1114. The message can include the characterizing data generated at blocks 1110a and 1110b.

At block 1116, the characterizing data arising from the signal collected at wearable device 100 are compared to the characterizing data arising from the signal collected at host device 102 to determine a difference measure. For example, if the data characterizes frequency components, this comparison can include determining a difference between or ratio of corresponding powers (i.e., in the same frequency band). Similarly, differences in amplitude characteristics can be determined.

This difference measure can be compared to a threshold at decision block 1118. If the difference is larger than a threshold, it can be inferred that an adjustment should be made to an alert volume setting of the host device, and the adjustment can be made at block 1120. A magnitude of the adjustment can be fixed or dependent on a magnitude of the power difference.

The difference measure can provide information about the relative locations of host device 102 and wearable device 100. For instance, in some embodiments, the difference measure can assess correlations between the characteristic data of the two signals (e.g., correlations in the power distribution across a frequency spectrum), and weaker correlations can suggest a greater distance between the devices. In some embodiments, if the power distributions indicated for the two signals are correlated but total power of one signal is weaker, this can suggest that one of the devices is shielded by a sonic barrier (or at least more shielded than the other). As another example, if one of the signals shows selective degradation at high frequency relative to the other, this can also be indicative of a sonic barrier. Accordingly, the comparison of audio signals can be used to determine, for instance, that host device 102 is collecting a degraded audio signal relative to wearable device 100 and is therefore likely shielded by a sonic barrier. This can suggest that a user wearing wearable device 100 may have difficulty hearing alerts sounded by host device 102, and an appropriate volume adjustment can be made.

It will be appreciated that process 1100 is illustrative and that variations and modifications are possible. Steps described as sequential may be executed in parallel (or vice versa), order of steps may be varied, and steps may be modified, combined, added or omitted. Characterizing data can be defined as desired for a particular use-case, and either device can transmit characterizing data to the other for comparison. Further, while computation of characterizing data can reduce the amount of data to be transmitted, it is to be understood that a device can transmit the collected audio signal (in compressed or uncompressed formats) rather than just the characterizing data.

Figure 12:
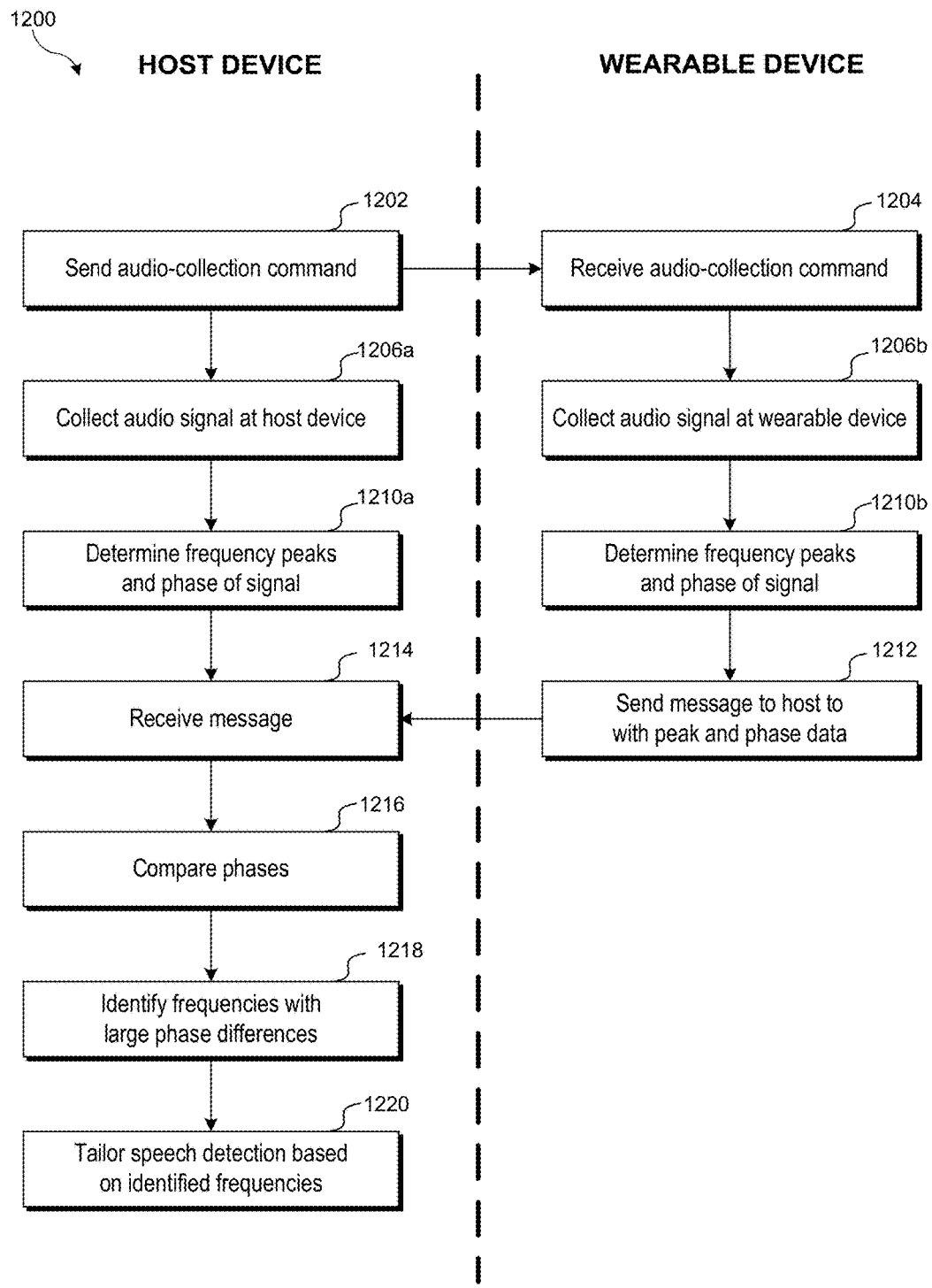
FIG. 12 is a flow diagram of a process for comparing simultaneously-collected audio signals at a wearable device and a host device according to another embodiment of the present invention.

In some embodiments, processes similar to process 900 can be used to facilitate adjustments to settings other than alerts. For example, comparison of audio signals in a host device and a wearable device can be used in connection with noise cancellation or noise reduction processes, such as distinguishing a user's speech from background noise. FIG. 12 is a flow diagram of a process 1200 for comparing simultaneously collected audio signals at a wearable device and at a host device according to another embodiment of the present invention. Part of process 1200 can be implemented in a wearable device, e.g., wearable device 100 of FIG. 1 or wearable device 200 of FIG. 2, and part of process 1200 can be implemented in host device 102. In some embodiments, the implementation of process 1200 can include program code executed by one or more processors of wearable device 100 and/or host device 102.

Blocks 1202-1206b can be similar or identical to blocks 1102-1106b of process 1100. In process 1200, the signal analysis at blocks 1210a and 1210b can be directed to identifying signal phases at particular frequencies (e.g., frequencies corresponding to general or user-specific speech frequencies or frequencies having absolute or relative peak powers).

Blocks 1212 and 1214 can be similar or identical to blocks 1112 and 1114 of process 1100. At block 1216, the phases can be compared. This comparison can include determining a difference between corresponding phases at each of a set of frequencies. At block 1218, frequencies corresponding to large phase differences are identified. This identification can include identifying one or more (e.g., three) frequencies having the highest phase difference or identifying any frequencies with a phase difference larger than a threshold. Large phase differences can suggest that an audio source providing those frequency contributions is relatively close to the devices. For example, a user's voice can reach a phone held to his head substantially earlier than a watch worn on the opposite wrist, while siren noise from a block away can reach both devices at substantially the same time.

At block 1220, host device 102 can then tailor speech detection based on the identified frequencies. For example, later-collected audio signals can be filtered to focus on frequencies that had large phase differences.

Embodiments described above can exploit the presence of a microphone in a wearable device to facilitate adjustments at the host device, such as automatically adjusting the volume of an alert sound if the wearable device determines that the alert sound is too weak (or too strong) or if a comparison of sounds between the host device and wearable device indicates that the host device is relatively far away or shielded by a sonic barrier. In some instances, the magnitude of any adjustment can also be determined based on the audio signal analysis. As noted above, the signal analysis can incorporate a variety of algorithms including time-domain and/or frequency-domain algorithms.

While the invention has been described with respect to specific embodiments, one skilled in the art will recognize that numerous modifications are possible and that components, operations, and/or other features that may be described with respect to different embodiments can be incorporated into the same embodiment. Wearable devices can interact with host devices to facilitate a variety of operations with increased convenience to the user.

All user interfaces shown herein are also illustrative. Sizes of user interfaces or graphical elements thereof can be modified according to a particular desired form factor of a wearable device and/or host device. Icons can be used in addition to or instead of text to identify associated functions, and the number and arrangement of controls can be varied to facilitate user operation. In some embodiments, the user may be able to scroll the display, e.g., by dragging one or two fingers along the surface of a touchscreen display to see more options than can be presented at once. Further, while the foregoing description may refer to graphical user interfaces, other interfaces can also be used. For example, an audio input interface can be provided by allowing the user to speak into a microphone of a wearable device; the wearable device can interpret the audio signal locally to determine a corresponding instruction or send the audio to a host device for interpretation. Similarly, an audio output interface can be provided by using a speaker on the wearable device to produce sounds. The sounds can include tones (beeps, whirrs, etc.) and/or speech sounds; for example, synthesized speech can be generated on a host device and transmitted to the wearable device as a digital audio signal, or the wearable device can include its own speech synthesizer. In some embodiments where a wearable device is worn on the user's hand, wrist, or arm, user input can include spatial gestures with the hand, wrist, and/or arm that are detected using motion sensors of the wearable device in addition to or instead of touch gestures involving contact with a touch-sensitive surface of the wearable device. Different gestures can be assigned different meanings, and the meaning of a gesture can be context-dependent, e.g., depending on what operations of the host device and/or wearable device are currently in progress. Thus, the same gesture can, in different contexts, indicate hanging up a call or stopping playback of a media track. Touch gestures and spatial gestures can be used in various combinations as desired.

The foregoing description may make reference to specific examples of a wearable device (e.g., a wrist-worn device) and/or a host device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of operating a wearable device, the method comprising:
  receiving, by the wearable device, a notification indicating that a host device is preparing to sound an alert sound;
  collecting, by the wearable device, a first audio signal at least in response to receiving the notification, the first audio signal comprising at least a reference signal corresponding to the alert sound generated by a speaker of a host device paired with the wearable device;
  extracting, by the wearable device, a first component of the first audio signal;

determining, by the wearable device, a property of the first component, the property being indicative of a strength of a contribution of the reference signal with respect to the first audio signal;

based at least in part on the determined property, generating, by the wearable device, a message for the host device paired with the wearable device, the message including an instruction to the host device to adjust a volume setting of the alert sound generated by the speaker of the host device; and transmitting, by the wearable device, the generated message from the wearable device to the host device paired with the wearable device, the instruction in the generated message configured to instruct the host device paired with the wearable device to adjust the volume setting of the alert sound.

2. The method of claim 1, wherein the host device includes a mobile phone, wherein the alert is indicative of an incoming call being received at the phone, and wherein the reference signal corresponds to a ringtone used by the phone.

3. The method of claim 1 wherein the property of the first component includes one or more of a sound intensity of the first component, a signal amplitude of the first component, or a power of a frequency spectrum of the first component.

4. The method of claim 1 wherein the reference signal corresponds to a signal collected by the host device, the first audio signal and the reference audio signal being collected at substantially the same time.

5. The method of claim 1 further comprising:
analyzing, at the wearable device, the property by comparing the property to a low threshold;
wherein the wearable device transmits the message to the host device in the event that the property is below the low threshold.

6. The method of claim 1 further comprising:
analyzing, at the wearable device, the property by comparing the property to a low threshold;
wherein the wearable device transmits the message to the host device in the event that the property is above the high threshold.

7. A wearable device, comprising:
at least one memory configured to store computer-executable instructions; and
at least one processor in communication with the at least one memory configured to execute the computer-executable instructions to at least:
receive a notification indicating that a host device is preparing to sound an alert sound;
collect a first audio signal at least in response to receiving the notification, the first audio signal comprising at least a reference signal corresponding to the alert sound generated by a speaker of the host device paired with the wearable device;
extract a first component of the first audio signal;
determine a property of the first component, the property being indicative of a strength of a contribution of the reference signal with respect to the first audio signal;
based at least in part on the determined property, generate a message for the host device paired with the wearable device, the message including an instruction to the host device to adjust a volume setting of the alert sound generated by the speaker of the host device; and transmit the generated message from the wearable device to the host device paired with the wearable device, the instruction in the generated message configured to instruct the host device paired with the wearable device to adjust the volume setting of the alert sound.

8. The wearable device of claim 7, wherein the host device comprises a mobile phone, wherein the alert is indicative of an incoming call being received at the phone, and wherein the reference signal corresponds to a ringtone used by the phone.

9. The wearable device of claim 7, wherein the property of the first component includes one or more of a sound intensity of the first component, a signal amplitude of the first component, or a power of a frequency spectrum of the first component.

10. The wearable device of claim 7, wherein the reference signal corresponds to a signal collected by the host device, the first audio signal and the reference audio signal being collected at substantially the same time.

11. The wearable device of claim 7, wherein the at least one processor is further configured to execute the computer-executable instructions to at least analyze the property by comparing the property to a low threshold, wherein the wearable device transmits the message to the host device in the event that the property is below the low threshold.

12. The wearable device of claim 7, wherein the at least one processor is further configured to execute the computer-executable instructions to at least analyze the property by comparing the property to a high threshold, wherein the wearable device transmits the message to the host device in the event that the property is above the high threshold.

13. A computer-readable storage medium storing computer-executable instructions for implementing a wearable device that, when executed by at least one processor, configure the at least one processor to perform operations comprising:
receiving a notification indicating that a host device is preparing to sound an alert sound;
collecting a first audio signal at least in response to receiving the notification, the first audio signal comprising at least a reference signal corresponding to the alert sound generated by a speaker of the host device paired with the wearable device;
extracting a first component of the first audio signal;
determining a property of the first component, the property being indicative of a strength of a contribution of the reference signal with respect to the first audio signal;
based at least in part on the determined property, generating a message for the host device paired with the wearable device, the message including an instruction to the host device to adjust a volume setting of the alert sound generated by the speaker of the host device; and
transmitting the generated message from the wearable device to the host device paired with the wearable device, the instruction in the generated message configured to instruct the host device paired with the wearable device to adjust the volume setting of the alert sound.

14. The computer-readable storage medium of claim 13, wherein the host device comprises a mobile phone, wherein the alert is indicative of an incoming call being received at the phone, and wherein the reference signal corresponds to a ringtone used by the phone.

15. The computer-readable storage medium of claim 13, wherein the property of the first component includes one or more of a sound intensity of the first component, a signal amplitude of the first component, or a power of a frequency spectrum of the first component.

16. The computer-readable storage medium of claim 13, wherein the reference signal corresponds to a signal collected by the host device, the first audio signal and the reference audio signal being collected at substantially the same time.

17. The computer-readable storage medium of claim 13, wherein the operations further comprise analyzing the property by comparing the property to a low threshold, wherein the wearable device transmits the message to the host device in the event that the property is below the low threshold.

18. The computer-readable storage medium of claim 13, wherein the operations further comprise analyzing the property by comparing the property to a high threshold, wherein the wearable device transmits the message to the host device in the event that the property is above the high threshold.

* * * * *